United States Patent
Dastidar et al.

(10) Patent No.: US 11,983,133 B2
(45) Date of Patent: May 14, 2024

(54) ADAPTIVE INTEGRATED PROGRAMMABLE DATA PROCESSING UNIT

(71) Applicant: XILINX, INC., San Jose, CA (US)

(72) Inventors: Jaideep Dastidar, San Jose, CA (US); David James Riddoch, Cambridgeshire (GB); Steven Leslie Pope, Cambridge (GB)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/892,949

(22) Filed: Aug. 22, 2022

(65) Prior Publication Data
US 2024/0061799 A1    Feb. 22, 2024

(51) Int. Cl.
*G06F 13/40*    (2006.01)
*G06F 13/28*    (2006.01)

(52) U.S. Cl.
CPC .......... *G06F 13/4027* (2013.01); *G06F 13/28* (2013.01)

(58) Field of Classification Search
CPC ............................. G06F 13/4027; G06F 13/28
See application file for complete search history.

(56) References Cited

U.S. PATENT DOCUMENTS

| | | | |
|---|---|---|---|
| 10,673,439 B1 | 6/2020 | Ahmad et al. | |
| 10,698,842 B1 | 6/2020 | Dastidar et al. | |
| 10,999,401 B2* | 5/2021 | Loewenstein | H04L 67/1097 |
| 11,036,660 B2* | 6/2021 | Ooi | G06F 13/20 |
| 11,063,594 B1* | 7/2021 | Ahmad | G06F 13/16 |
| 11,100,028 B1 | 8/2021 | Subramaniam et al. | |
| 11,375,050 B1* | 6/2022 | Mittal | H04L 69/08 |
| 11,580,054 B2* | 2/2023 | Teh | G06F 15/7825 |
| 11,675,722 B2* | 6/2023 | Kolor | G06F 13/4022 710/306 |
| 2019/0004990 A1* | 1/2019 | Van Doren | G06F 13/4234 |
| 2019/0196901 A1* | 6/2019 | Arbel | G06F 11/1068 |
| 2019/0363829 A1 | 11/2019 | Tune et al. | |
| 2020/0327088 A1 | 10/2020 | Choudhary et al. | |
| 2021/0042252 A1* | 2/2021 | Thyamagondlu | G06F 30/34 |

OTHER PUBLICATIONS

International Search Report and Written Opinion for PCT/US2023/018476 dated Jul. 5, 2023.

\* cited by examiner

*Primary Examiner* — Henry Tsai
*Assistant Examiner* — Christopher A Daley
(74) *Attorney, Agent, or Firm* — Patterson + Sheridan, LLP

(57) ABSTRACT

An integrated circuit device includes multiple heterogeneous functional circuit blocks and interface circuitry that permits the heterogeneous functional circuit blocks to exchange data with one another using communication protocols of the respective heterogeneous functional circuit blocks. The IC device includes fixed-function circuitry, user-configurable circuitry (e.g., programmable logic), and/or embedded processors/cores. A functional circuit block may be configured in fixed-function circuitry or in the user-configurable circuitry (i.e., as a plug-in). The interface circuitry includes a network-on-a-chip (NoC), an adaptor configured in the user-configurable circuitry, and/or memory. The memory may be accessible to the functional circuit blocks through an adaptor configured the user-configurable circuitry and/or through the NoC. The IC device may be configured as a SmartNIC, DPU, or other type of system-on-a-chip (SoC).

20 Claims, 12 Drawing Sheets

ADAPTIVE INTEGRATED PROGRAMMABLE DATA PROCESSING UNIT

TECHNICAL FIELD

Examples of the present disclosure generally relate to integration of heterogeneous circuit blocks on an integrated circuit device servicing a smart network interface controller (SmartNIC) or data processing unit (DPU) function.

BACKGROUND

In a system-on-a-chip (SoC) servicing a SmartNIC or DPU function, multiple circuit blocks may be combined with little or no appreciable attempt to consolidate and/or eliminate redundant and/or unnecessary features (e.g., memory, input/output buffering circuitry), optimize communication amongst the circuit blocks, address security/confidentiality of data transfers amongst the circuit blocks, or accommodate updates or changes to the circuit blocks. Such a SoC may utilize more area than necessary, consume more power than necessary, suffer from unnecessary loss of performance and/or latency, compromise security of user/tenant data, and/or become prematurely obsolete.

SUMMARY

Techniques to flexibly integrate heterogeneous functional circuit blocks are described.

One example is an integrated circuit (IC) device that includes multiple heterogeneous functional circuit blocks and interface circuitry that permits the heterogeneous functional circuit blocks to exchange data with one another using communication protocols of the respective heterogeneous functional circuit blocks.

Another example described herein is a system-on-a-chip (SoC) that includes a host subsystem that interfaces with a local device, a network subsystem that interfaces with an external packet-switched network, an accelerator block that includes multiple heterogeneous functional circuit blocks, where each of the heterogeneous functional circuit blocks performs a respective one of multiple tasks on data from the host subsystem and/or the network subsystem, and interface circuitry that permits the heterogeneous functional circuit blocks to exchange data with one another using communication protocols of the respective heterogeneous functional circuit blocks.

Another example described herein is a method that includes interfacing with an external packet-switched network through a network subsystem of a system-on-a-chip (SoC), interfacing with a local device through host interface subsystem of the SoC, processing data from the network subsystem and/or the host interface subsystem using heterogeneous functional circuit blocks of the SoC, and exchanging data amongst the functional circuit blocks using communication protocols of the respective functional circuit blocks, where the heterogeneous functional circuit blocks are implemented in fixed-function circuitry, configurable circuitry, embedded processor circuitry, and/or combinations thereof.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
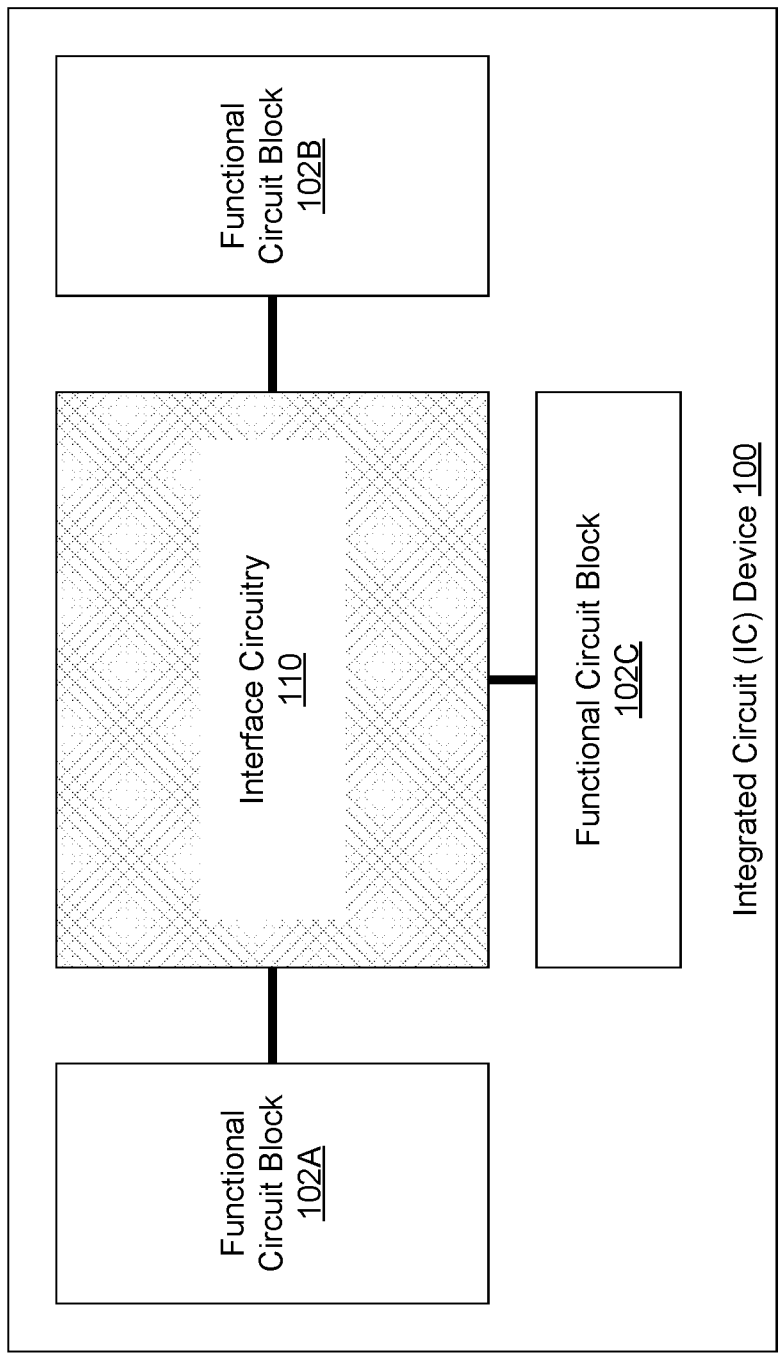
FIG. 1 is a block diagram of an integrated circuit (IC) device that includes multiple heterogeneous functional circuit blocks and flexible or configurable interface circuitry that permits the functional circuit blocks to communicate (e.g., share/exchange data) with one another using native communication protocols of the respective functional circuit blocks.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe methods and systems to flexibly integrate functional heterogeneous circuit blocks within an integrated circuit (IC) device to permit the functional heterogeneous circuit blocks to communicate with one another (e.g., share/exchange data) using communication protocols of the respective functional circuit blocks.

Embodiments herein include multiple techniques to communicate or share data amongst the functional circuit blocks using the communication protocols of the respective functional circuit blocks. Various combinations of the techniques may be utilized to provide a flexible/configurable communication fabric. The communication techniques include adaptors configured in programmable logic to permit direct communications between functional circuit blocks, on-chip packet-switched networks (i.e., network-on-chip or NoC), and shared memory.

Embodiments herein may be useful to consolidate heterogeneous or disparate functional circuit blocks as a system-on-a-chip (SoC), such as a smart network interface controller (SmartNIC) or Data Processing Unit (DPU).

Embodiments herein may be useful to provide an adaptive compute acceleration platform, such as for a SmartNIC or DPU domain.

Embodiments herein may be useful to offload tasks from a local device (e.g., a host computer system/server and/or a storage device and/or a network device). This may permit the local device to focus on tasks that can be billed to user/customers/tenants (i.e., to maximize income without sacrificing tenant security).

Embodiments herein include a flexible combinations of fixed-logic or fixed-function circuitry (e.g., application specific integrated circuitry (ASIC)), embedded processors/cores, configurable circuitry (e.g., programmable logic of a field programmable gate array (FPGA)), and combinations thereof.

A task may be assigned to a type of circuitry or may be divided amongst a combination of types based on characteristics of the task and characteristics of the types of circuitry. For example, fixed-function circuitry may be useful for tasks or sub-tasks that are expected to be widely used, used in a variety of applications/situations, and/or not expected to change in the appreciable future. Examples include, without limitation, standards-based interfacing (e.g., Ethernet and/or peripheral component interconnect express (PCIe) interface standards), and cryptographic tasks. Fixed function circuitry may be useful for power consumption considerations.

Embedded processors/cores may be useful for high software flexibility tasks (e.g. open source software stacks) or relatively low functionality tasks (e.g., non-floating point operations or tasks where speed or high-throughput is not critical).

Configurable circuitry (e.g., programmable logic/field programmable gate arrays (FPGAs)), may be useful where flexibility is important (e.g., to accommodate user-specific or infrequently used tasks), such as to provide unique plug-ins, as adaptors to translate between communication protocols of heterogeneous functional circuit blocks, and/or to accommodate rapidly evolving and/or new acceleration or offload functionality.

Embodiments herein may be useful to present a unified software view of heterogeneous elements of a SoC.

FIG. 1 is a block diagram of an integrated circuit (IC) device 100 that includes multiple heterogeneous functional circuit blocks 102 and flexible or configurable interface circuitry 110 that permits functional circuit blocks 102 to communicate (e.g., share/exchange data) with one another using native communication protocols of the respective functional circuit blocks. Functional circuit blocks 102 are heterogeneous in that the communication protocols of functional circuit blocks 102 differ from one another. IC device 100 may also include homogeneous circuit blocks.

One or more of functional circuit blocks 102, or a portion thereof, may include fixed-function circuitry (e.g., application specific integrated circuitry (ASIC)), processor circuitry, and/or configurable circuitry (e.g., programmable logic).

IC device 100 may be configurable in multiple respects, including configuring features of a functional circuit block, dynamically adding a functional circuit block in configurable circuitry (i.e., a plug-in), and configuring interface circuitry 110 in configurable circuitry (e.g., configuring/adding an adaptor, configuring access to memory 604, and configuring access to NoC circuitry 202).

For illustrative purposes, IC device 100 is described in one or more examples herein as a network interface device that interfaces between a packet-switched network and a local device, such as a host computer system (e.g., a server, server farm, and/or data center) and/or a storage system. IC device 100, may represent, for example, a smart network interface controller (SmartNIC) or data processing unit (DPU) that performs tasks in addition to conventional NIC tasks. IC device 100 may, for example, offload tasks of the host computer system or the storage system or the network system. Such tasks may be referred to herein as accelerated tasks. IC device 100 may perform accelerated tasks in a pipeline and/or parallel fashion. IC device 100 is not, however, limited to any of the foregoing examples.

Example embodiments of interface circuitry 110 are provided below with reference to FIGS. 2-6.

Figure 2:
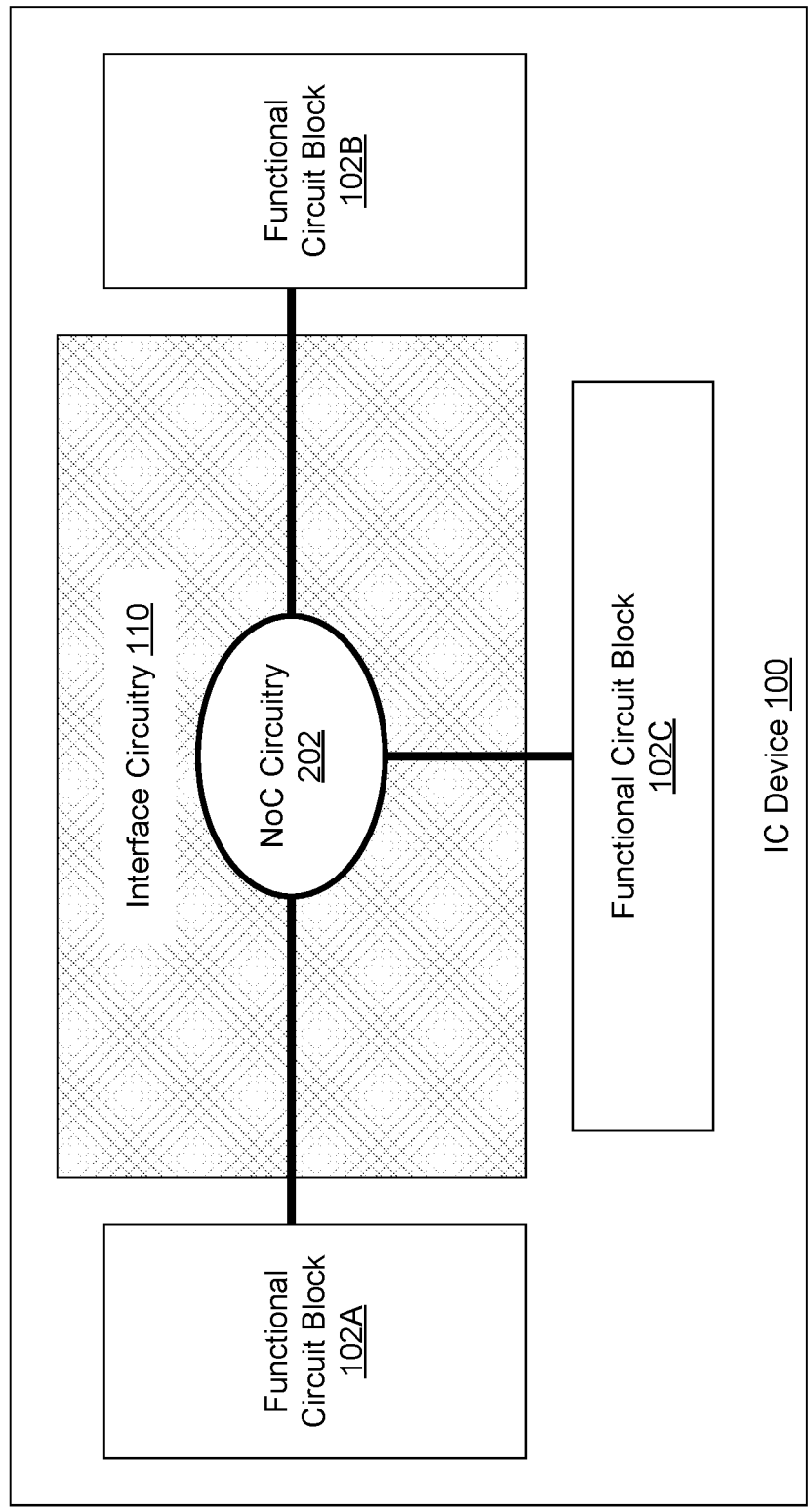
FIG. 2 is a block diagram of the IC device in which the interface circuitry includes network-on-chip (NoC) circuitry that permits the functional circuit blocks to communicate with one another over an on-chip packet-switched network, according to an embodiment.

FIG. 2 is a block diagram of IC device 100 in which interface circuitry 110 includes network-on-chip (NoC) circuitry 202 that permits functional circuit blocks 102 to communicate with one another over an on-chip packet-switched network, according to an embodiment. NoC circuitry 202 may include NoC interface circuitry that interfaces with functional circuit blocks 102. An example is provided below with reference to FIG. 3.

Figure 3:
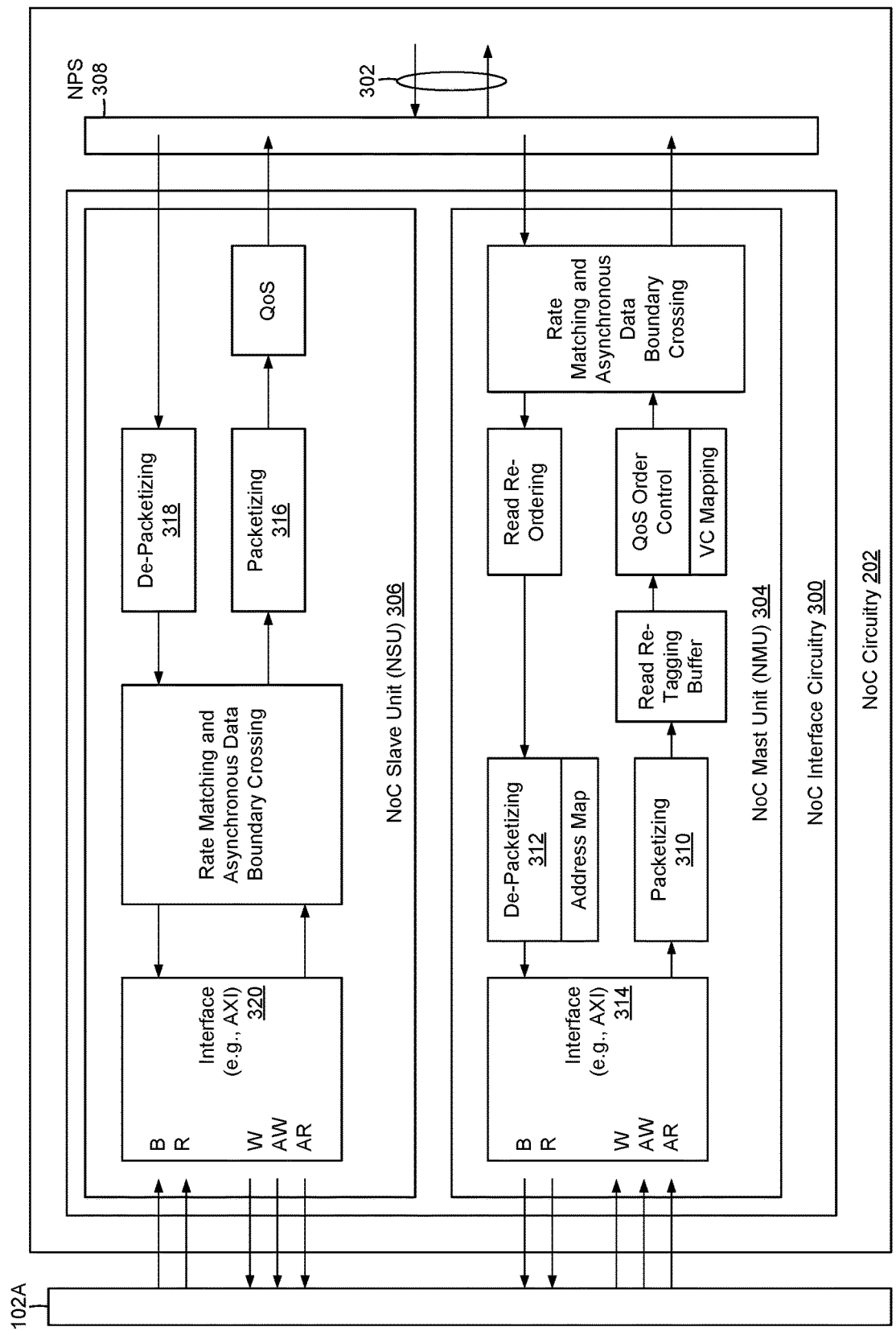
FIG. 3 is a block diagram of the NoC circuitry, including circuitry that interfaces with one of the functional circuit blocks, according to an embodiment.

FIG. 3 is a block diagram of NoC circuitry 202, including NoC interface circuitry 300 that interfaces with circuit block 102A, according to an embodiment. NoC interface circuitry 300 includes a NoC master unit (NMU) 304 that handles communications initiated by functional circuit block 102A (e.g., a memory access request). NoC interface circuitry 300 further includes a NoC slave unit (NMU) 306 that handles communications initiated by other circuitry and directed to functional circuit block 102A. NoC interface circuitry 300 further includes a NoC packet switch (NPS) 308 that interfaces between interconnections 302 and each of NMU 304 and NSU 306. Interconnections 302 may couple NPS 308 to other NPSs of NoC.

NMU 304 includes packetizing circuitry 310 to packetize data for transmission over NoC interconnections 302, and de-packetizing circuitry 312 to de-packetize transmissions received over NoC interconnections 302. NMU 304 further includes configurable interface circuitry 314 that converts between the communication protocol of functional circuit block 102A and a protocol of NMU 304.

NSU 306 includes packetizing circuitry 316 to packetize data for transmission over NoC interconnections 302, and de-packetizing circuitry 318 to de-packetize transmissions received over NoC interconnections 302. NSU 306 further includes configurable interface circuitry 320 that converts between the communication protocol of functional circuit block 102A and a protocol of NMU 304.

Figure 4:
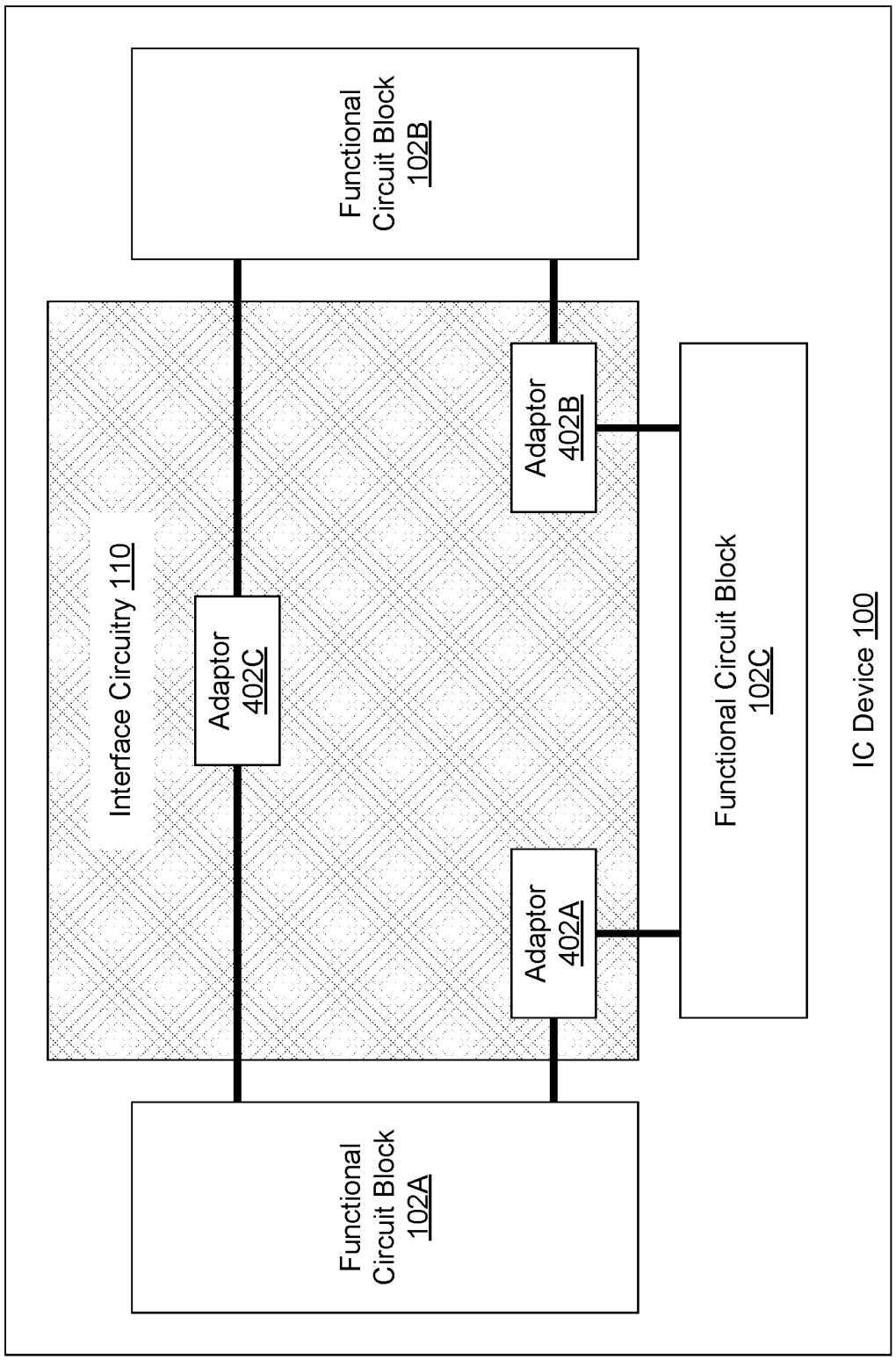
FIG. 4 is a block diagram of the IC device in which the interface circuitry includes one or more adaptors that translate communications between the functional circuit blocks based on the communication protocols of the respective functional circuit blocks, according to an embodiment.

FIG. 4 is a block diagram of IC device 100 in which interface circuitry 110 includes one or more adaptors 402 that translate communications between functional circuit blocks 102 based on the communication protocols of the respective functional circuit blocks 102, according to an embodiment. In FIG. 4, adaptors 402A, 402B, and 402C translate between respective pairs of functional circuit blocks 102A, 102B, and 102C. Adaptors 402 may be implemented with ASIC, configurable circuitry, embedded processor circuitry, and/or combinations thereof.

Figure 5:
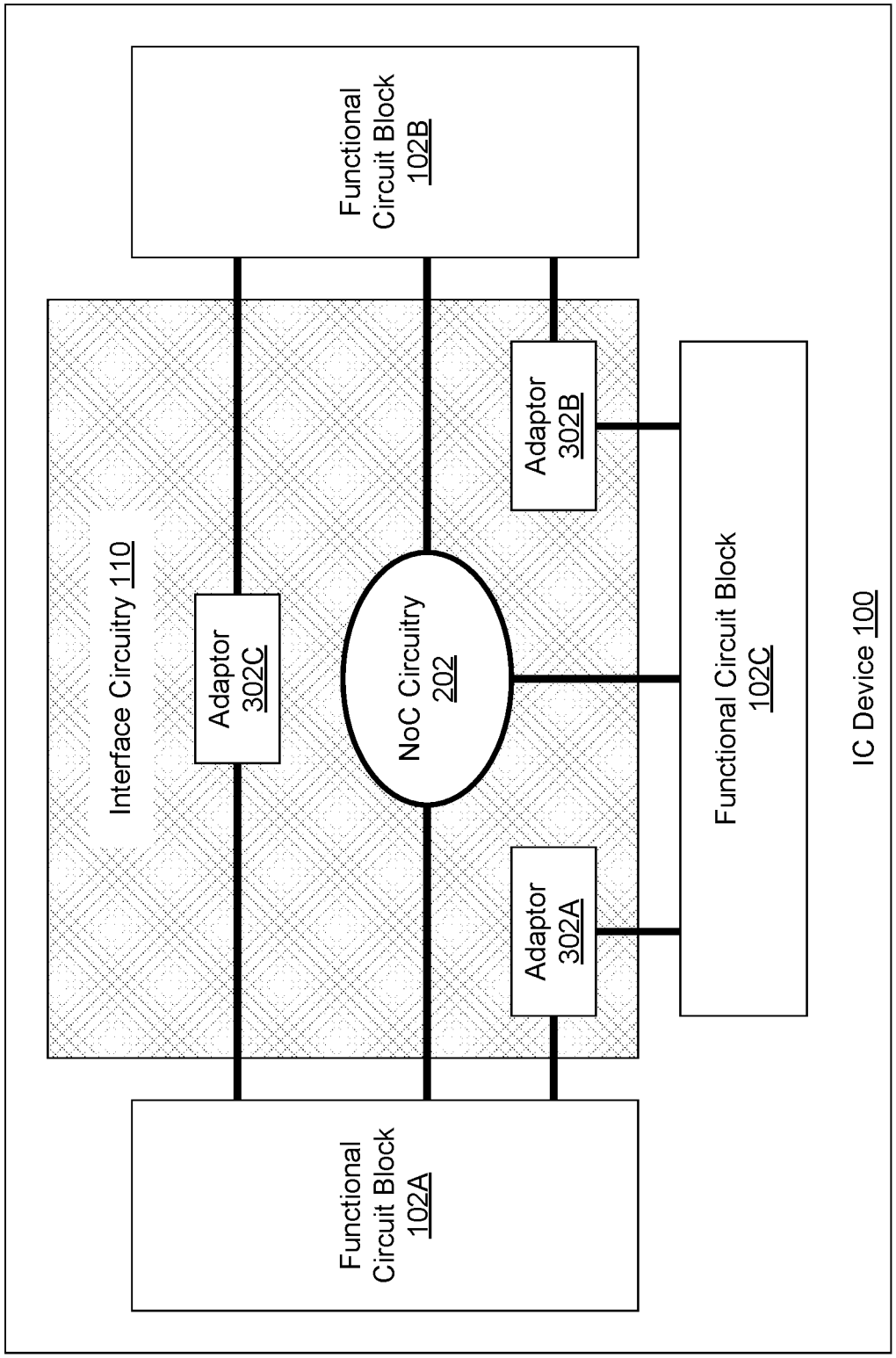
FIG. 5 is a block diagram of the IC device in which the interface circuitry includes a combination of the NoC circuitry and the adaptors, according to an embodiment.

FIG. 5 is a block diagram of IC device 100 in which interface circuitry 110 includes a combination of NoC circuitry 202 and adaptors 402, according to an embodiment. In this example, functional circuit blocks 102 may communicate with one another via adaptors 402 and/or NoC circuitry 202.

In an embodiment, interface circuitry 110 permits functional circuit blocks 102 to share or exchange data through shared memory. Examples are provided below with reference to FIG. 6.

Figure 6:
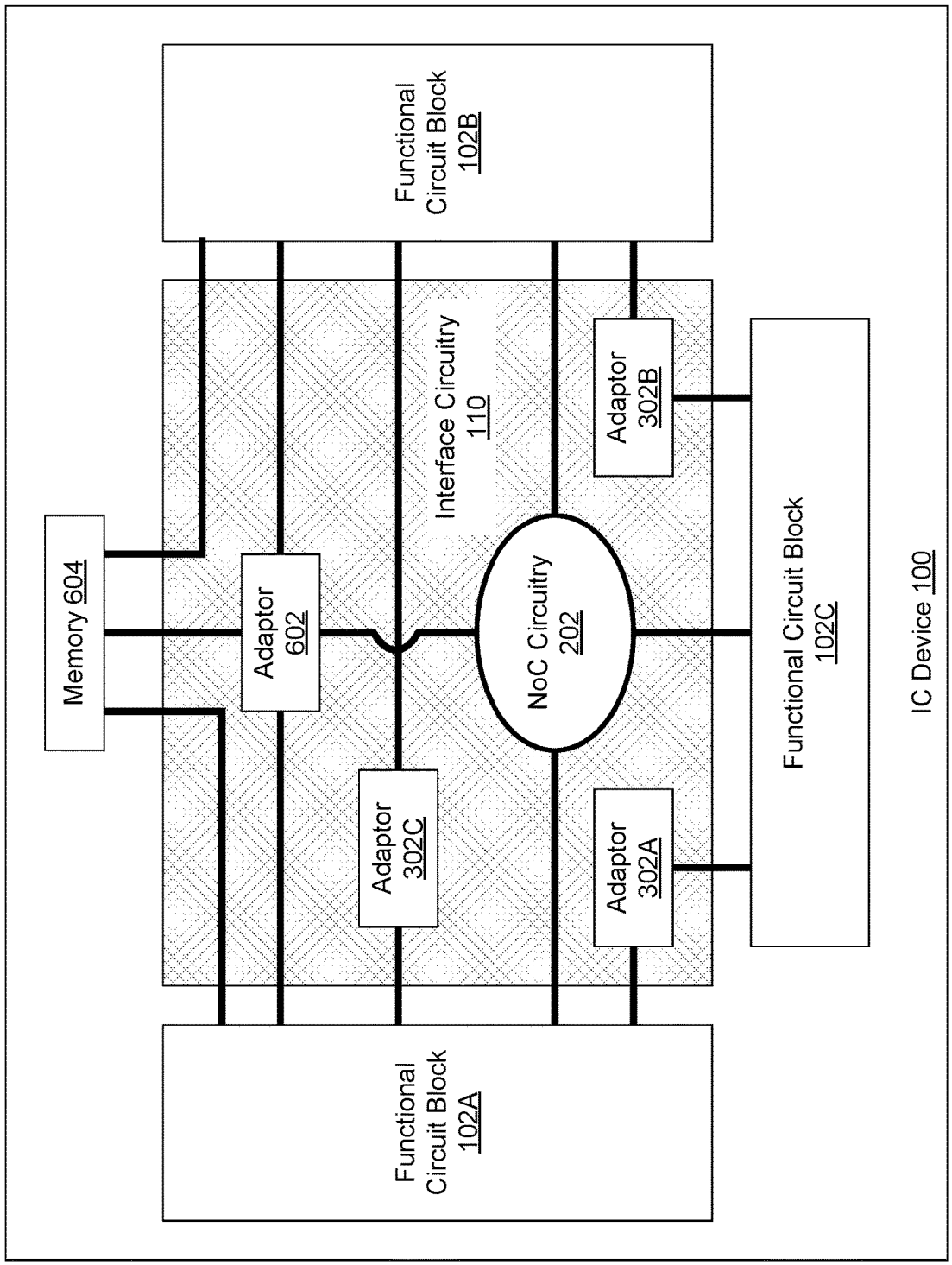
FIG. 6 is a block diagram of the IC device in which the interface circuitry permits the functional circuit blocks to communicate with one another through memory, according to an embodiment.

FIG. 6 is a block diagram of IC device 100, in which interface circuitry 110 permits functional circuit blocks 102 to communicate (e.g., to share or exchange data) with one another through memory 604, according to an embodiment. Memory 604 may be provided on-chip, as illustrated in FIG. 6, or off-chip.

In the example of FIG. 6, interface circuitry 110 includes one or more adaptors 602 that permit one or more of functional circuit blocks 102 to access a shared region of memory 604. Adaptor 602 may be configured as a direct memory access (DMA) controller. Adaptor 602 may implemented with fixed-function circuitry, configurable circuitry, an embedded processor, and/or combinations thereof.

Interface circuitry 110 further includes NoC circuitry 202. In this example, one or more of functional circuit blocks 102 may access adaptor 602 through the packet-switched network of NoC circuitry 202 and/or directly via adaptor 602 (i.e., without transiting the packet-switched network of NoC circuitry 202).

Functional circuit blocks 102 may communicate with one another through the shared region of memory 604. For example, functional circuit block 102A may process data and store the processed data in the shared region of memory 604. Thereafter, functional circuit block 102B may retrieve the data from the shared region of memory 604, and further process the data. Functional circuit block 102B may return the further processed data to the shared region of memory 604 and/or may send the further processed data to another one of functional circuit blocks 102 and/or to an off-chip device.

Example applications or use cases of IC device 100 are provided below.

Figure 7:
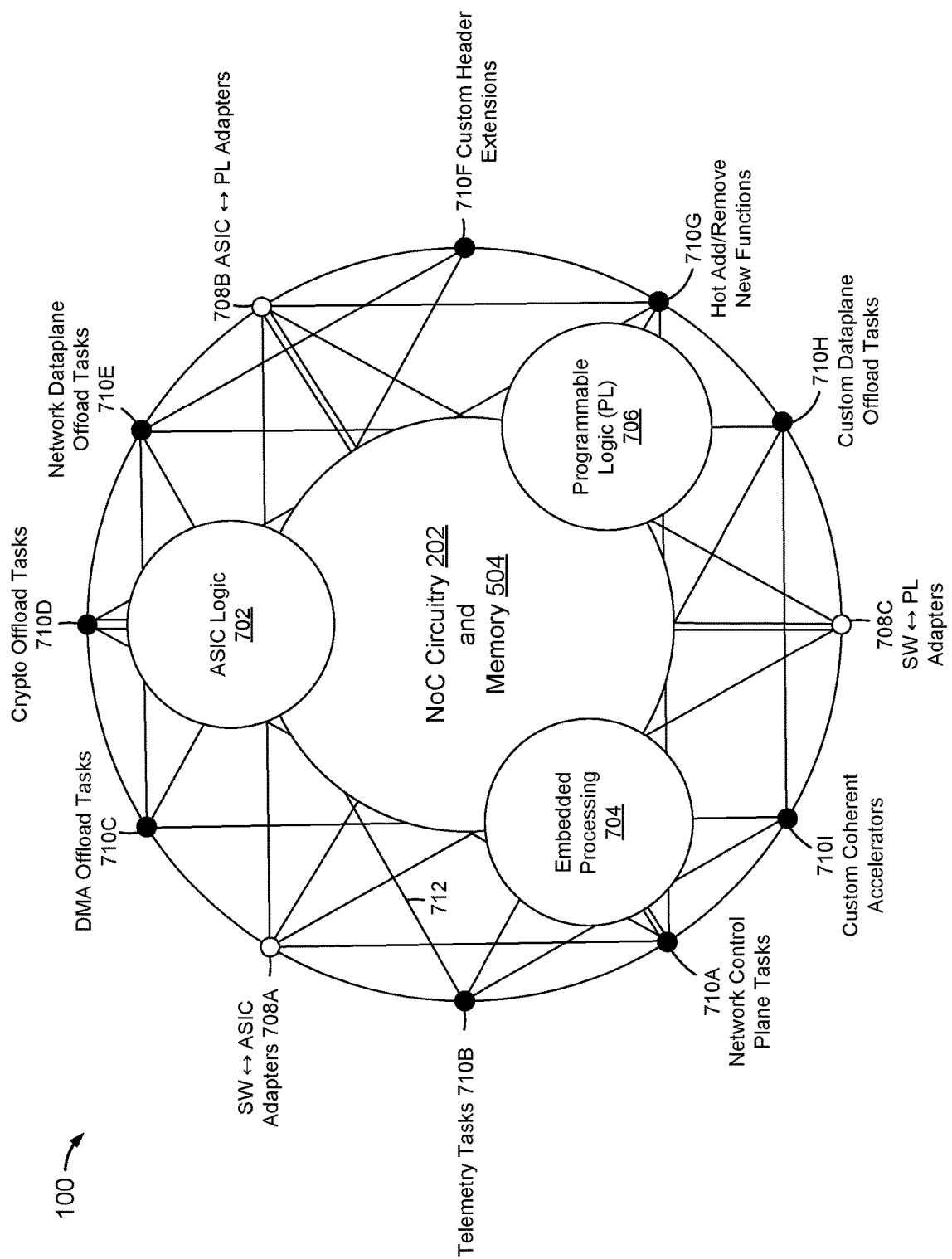
FIG. 7 is a conceptual illustration of the IC device configured as a network interface device, according to an embodiment.

FIG. 7 is a conceptual illustration of IC device 100 configured as a network interface device, according to an embodiment. In FIG. 7, IC device 100 includes ASIC logic 702, embedded processing circuitry 704, and programmable logic (PL) 706 (i.e., configurable circuitry).

ASIC logic 702, embedded processing circuitry 704, PL 706, and/or combinations, perform functions or tasks 710. In the example of FIG. 7, tasks 710 include network control plane tasks 710A, telemetry tasks 710B, DMA offload tasks 710C, cryptographic offload tasks 710D, network dataplane offload tasks 710E, customer header extensions 710F, hot add/remove new functions 710G, custom dataplane offload tasks 710H, and custom coherent accelerators 710I. IC device 100 may be dynamically configurable to add and/or remove functions, illustrated here as hot add/remove new functions 710G. Tasks 710 are not, however, limited to the foregoing examples. Tasks 710 may represent respective functional circuit blocks.

In FIG. 7, network control plane tasks 710A are illustrated physically proximate to embedded processing circuitry 704 to convey that network control plane tasks 710A may be performed entirely or substantially entirely within embedded processing circuitry 704.

Similarly, ASIC logic 702 is illustrated physically proximate to cryptographic offload tasks 710D to convey that cryptographic offload tasks 710D may be performed entirely or substantially entirely within ASIC logic 702.

In FIG. 7, IC device 100 further includes adaptors 700, including adaptors 708A that interface between ASIC logic 702 and embedded processing circuitry 704, adaptors 708B that interface between ASIC logic 702 and PL 706, and adaptors 708C that interface between embedded processing circuitry 704 and PL 706. Adaptors 708 may be implemented in ASIC logic 702, embedded processing circuitry 704, PL 706, and/or combinations thereof.

Tasks 710, or subsets thereof, may communicate with one another through adaptors 708. Alternatively, or additionally, tasks 710, or subsets thereof, may communicate directly with one another. For example, in FIG. 7, custom dataplane offload task 710H interfaces directly with telemetry tasks 710B over a link 712A, with network dataplane offload tasks 710E over a link 712B, and with custom coherent accelerators 710I over a link 712C, In FIG. 7, connectivity between/amongst ASIC logic 702, embedded processing circuitry 704, PL 706, and tasks 710, in accomplishing a particular task, are conceptually illustrated with lines, such as line 712. For example, telemetry tasks 710B, while primarily executed by the embedded processing circuitry 704, may have logical and/or physical connections to ASIC logic 702 and PL 706.

Figure 8:
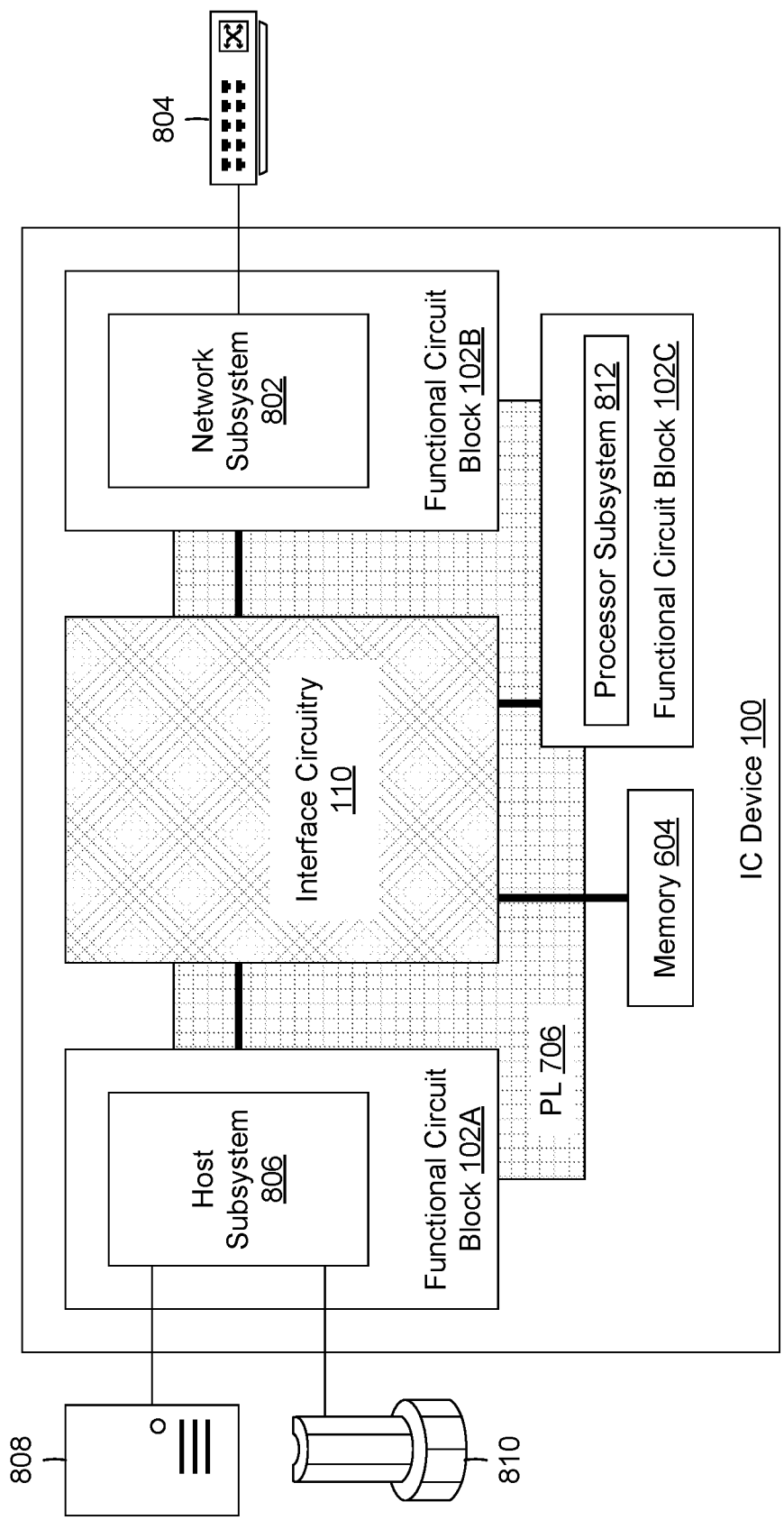
FIG. 8 is a block diagram of the IC device configured as a network interface device, according to an embodiment.

FIG. 8 is a block diagram of IC device 100 configured as a network interface device, according to an embodiment. In FIG. 8, functional circuit block 102B includes a network subsystem 802 that interfaces with a packet-switched network through a switch 804. Functional circuit block 102A includes a host subsystem 806 that interfaces with a host 808 and/or a storage system 810. Functional circuit block 102C includes a processor subsystem 812. One or more of functional circuit blocks 102A, 102B, and 102C may perform tasks in addition to conventional NIC tasks, such as described in one or more examples herein. Network subsystem 802, host subsystem 806, processor subsystem 812, interface circuitry 110, or portions thereof, may utilize PL logic 706. In an alternative embodiment, PL logic may be omitted from IC device 100.

Figure 9:
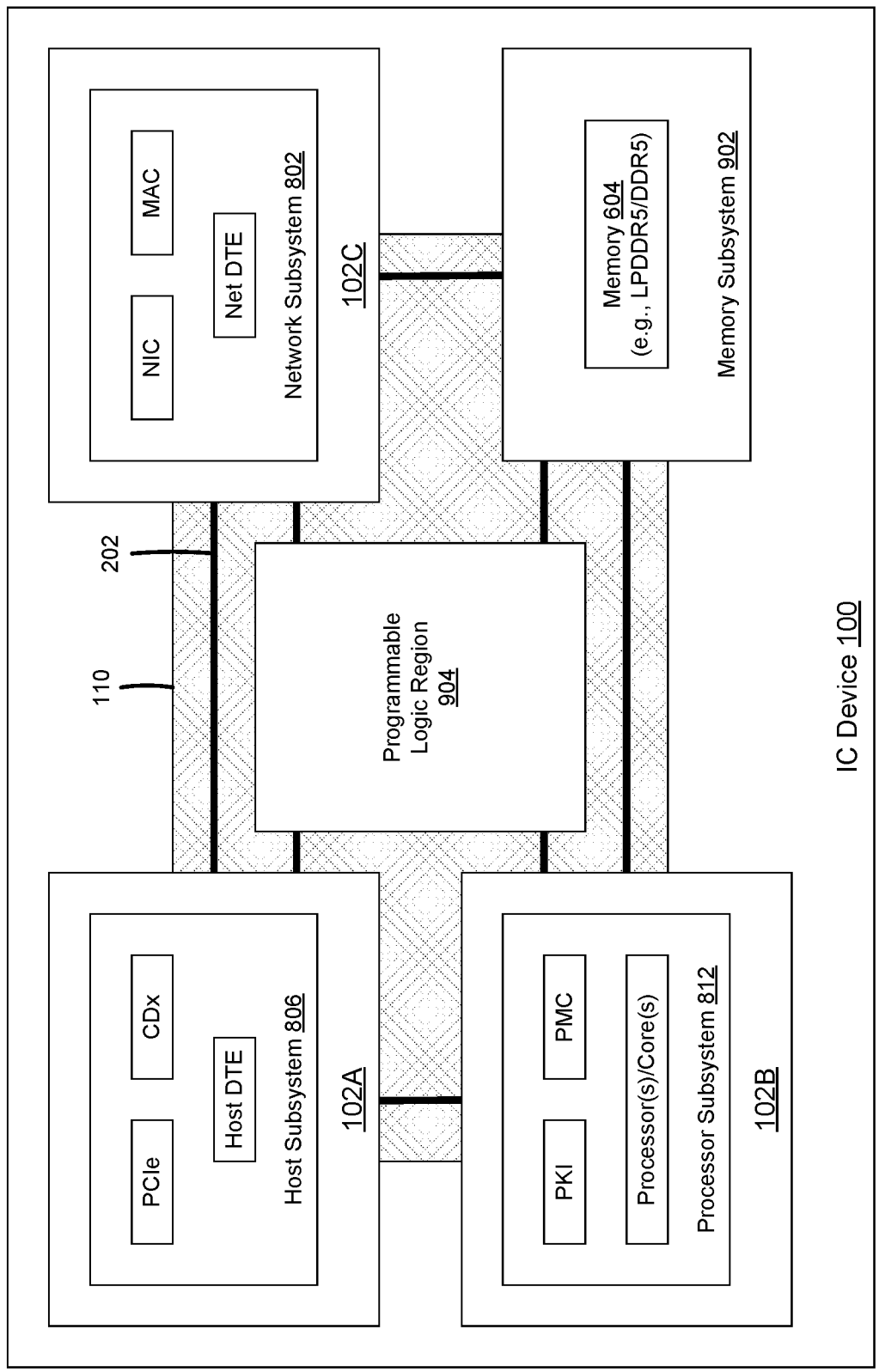
FIG. 9 is another block diagram of the IC device configured as a network interface device, according to an embodiment.

FIG. 9 is another block diagram of IC device 100 configured as a network interface device, according to an embodiment.

In FIG. 9, IC device 100 includes memory 604 within a memory subsystem 902. IC device 100 further includes a programmable logic region 904, which may include configurable hardware. Programmable logic region 904 may be programmable or configurable by, for example, a manufacturer, a distributor, and/or an end-user (e.g., cloud owner/operator or user/tenant).

IC device 100 further includes network subsystem 802, host subsystem 806, and processor subsystem 812 of FIG. 8. Network subsystem 802 may perform network domain specific acceleration tasks. Host subsystem 806 may perform host/local domain specific acceleration tasks. Processor subsystem 812 may perform domain assist processing (DAP) tasks. Programmable logic region 904 may perform DAP acceleration tasks and/or domain specific acceleration tasks.

Figure 10:
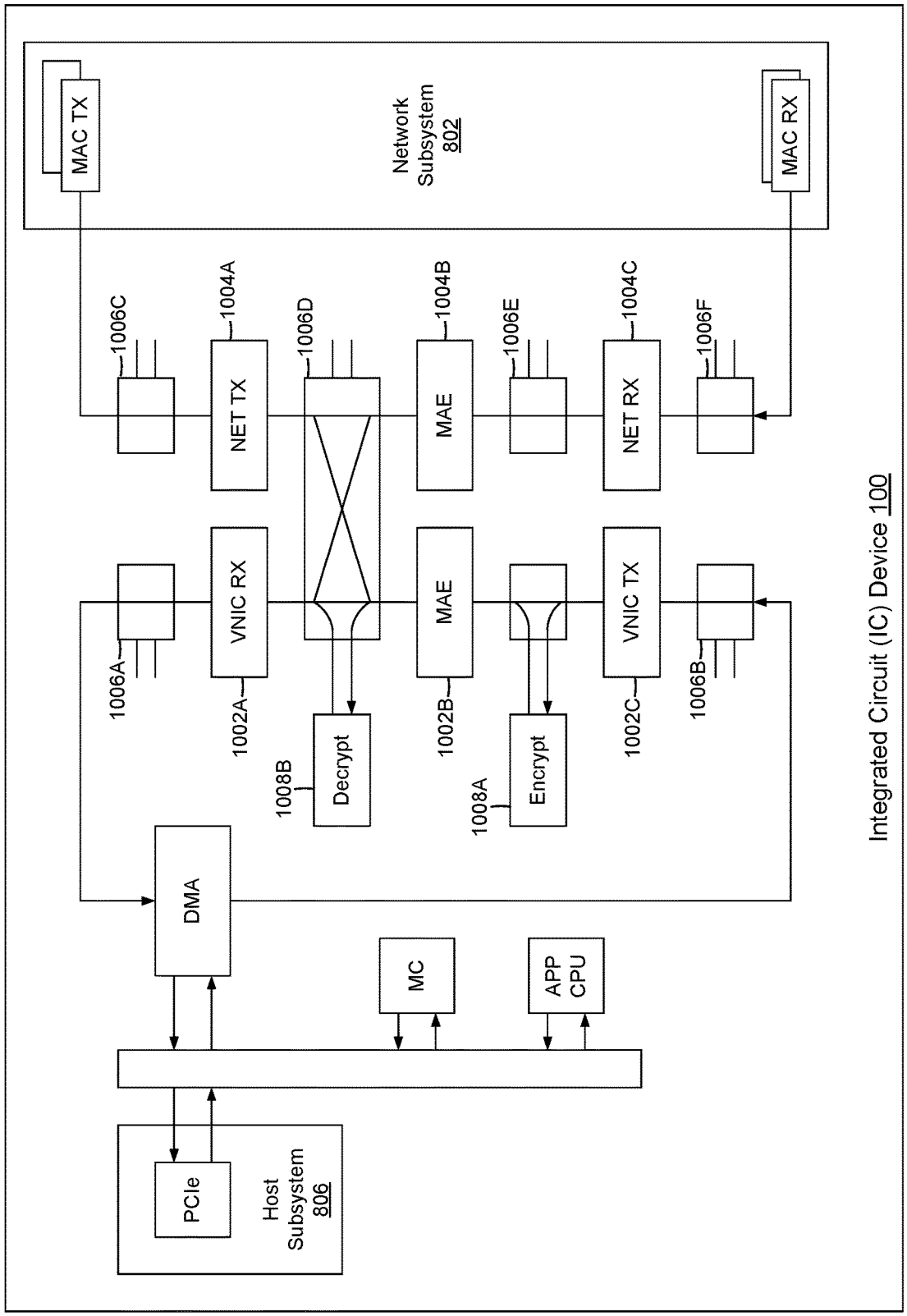
FIG. 10 is a block diagram of the IC device including data transform elements (DTEs) and data exchange elements (DEEs), according to an embodiment.

FIG. 10 is a block diagram of IC device 100 including data transform elements (DTEs) and data exchange elements (DEEs), according to an embodiment.

In FIG. 10, the DTEs include host-side DTEs 1002, network-side DTEs 1004, and encrypt and decrypt DTEs 1008A and 1008B. Host-side DTEs 1002 perform tasks related to a host (e.g., offloaded/accelerated host tasks). Network-side DTEs 1004 perform networking related tasks.

DEEs 1006A-1006F represent data handoffs (e.g., to/from memory and/or amongst DTEs). DEEs 1006A-1006F may represent data handoffs through NoC circuitry and/or through configurable adaptors. Elements 1006 may be used to exchange data amongst host-side DTEs 1002, amongst network-side DTEs 1004, and/or between host-side DTEs 1002 and network-side DTEs 1004.

DTEs and DEEs, such as those illustrated in FIG. 10, may include fixed-function circuitry, configurable circuitry, embedded processing circuitry, and/or combinations thereof.

A DTE or a DEE implemented in configurable circuitry may be referred to as a plug-in.

Figure 11:
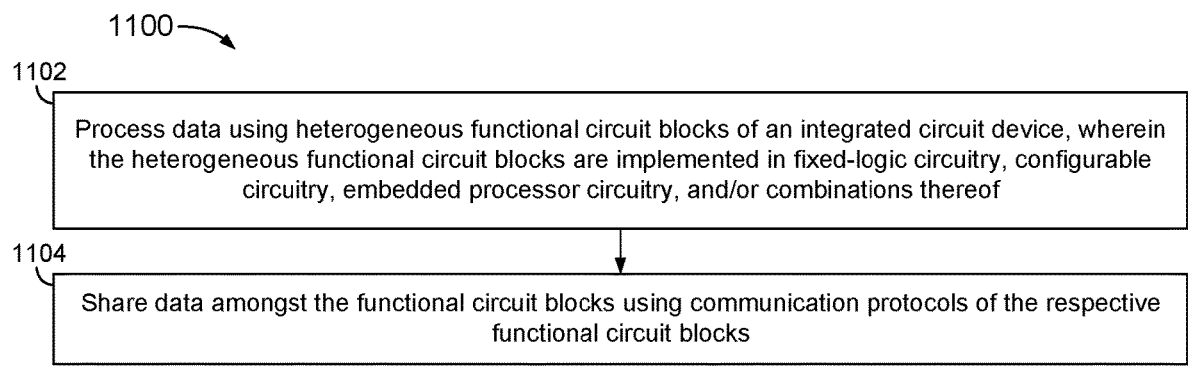
FIG. 11 is a flowchart of a method of processing data with heterogeneous functional circuit blocks, according to an embodiment.

FIG. 11 is a flowchart of a method 1100 of processing data with heterogeneous functional circuit blocks, according to an embodiment. Method 1100 is described below with reference to IC device 100. Method 1100 is not, however, limited to the example of IC device 100.

At 1102, IC device 100 processes data using heterogeneous functional circuit blocks 102 implemented in fixed-function circuitry, configurable circuitry, embedded processing circuitry, and/or combinations thereof, such as described in one or more examples herein.

At 1104, functional circuit blocks 102 share or exchange data amongst one another using communication protocols of the respective functional circuit blocks through configurable interface circuitry 110, such as described in one or more examples herein.

Method 1100 may be performed in a networking application, such as described below with reference to FIG. 12.

Figure 12:
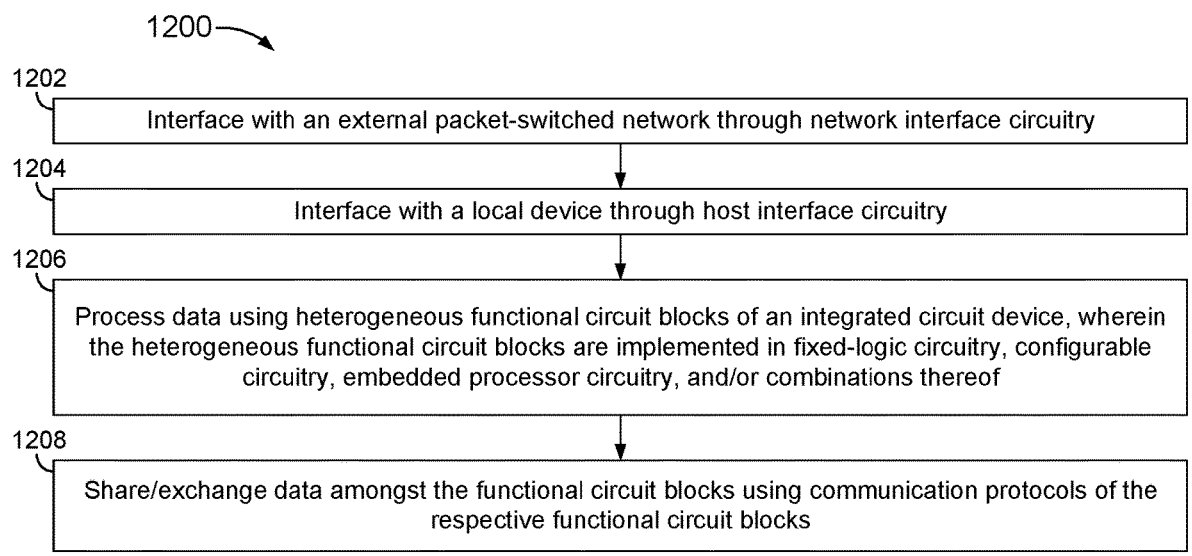
FIG. 12 is a flowchart of a method of processing data in a networking application using heterogeneous functional circuit blocks, according to an embodiment.

FIG. 12 is a flowchart of a method 1200 of processing data in a network interfacing application using heterogeneous functional circuit blocks, according to an embodiment. Method 1200 is described below with reference to IC device 100. Method 1100 is not, however, limited to the example of IC device 100.

At 1202, IC device 100 interfaces with an external packet-switched network through network subsystem 802 (FIGS. 8, 9, and 10), such as described in one or more examples herein.

At 1204, IC device 100 interfaces with a local device (e.g., host 808 and/or storage system 810 in FIG. 8) through host subsystem 806 (FIGS. 8, 9, and 10), such as described in one or more examples herein.

At 1206, IC device 100 processes data using heterogeneous functional circuit blocks 102, such as described with respect to one or more examples herein. IC device 100 may, for example, process data from the local device and/or from the external packet-switched network, such as described above with respect to FIGS. 8, 9, and/or 10.

At 1208, functional circuit blocks 102 share data amongst one another using communication protocols of the respective functional circuit blocks through configurable interface circuitry 110, such as described with respect to one or more examples herein.

Figure 13:
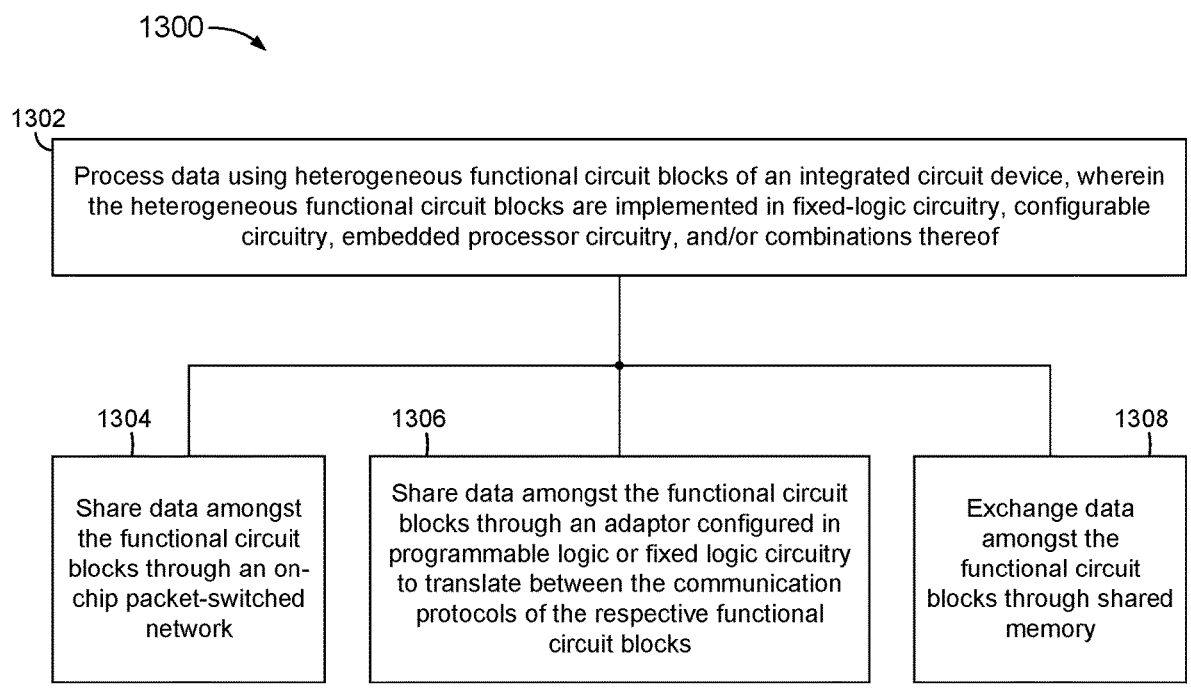
FIG. 13 is a flowchart of another method of processing data with heterogeneous functional circuit blocks, according to an embodiment.

FIG. 13 is a flowchart of a method 1300 of processing data with heterogeneous functional circuit blocks, according to an embodiment. Method 1300 is described below with reference to IC device 100. Method 1300 is not, however, limited to the example of IC device 100.

At 1302, IC device 100 processes data using heterogeneous functional circuit blocks 102 implemented in fixed-function circuitry, configurable circuitry, embedded processing circuitry, and/or combinations thereof, such as described in one or more examples herein.

At 1304, two or more of heterogeneous functional circuit blocks 102 share or exchange data through NoC circuitry 202, such as described in one or more examples herein.

At 1306, two or more of heterogeneous functional circuit blocks 102 share or exchange data through an adaptor 402, such as described in one or more examples herein.

At 1308, two or more of heterogeneous functional circuit blocks 102 share or exchange data through memory 604, such as described in one or more examples herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system-on-chip (SoC), comprising:
   multiple heterogeneous functional circuit blocks, wherein communication protocols of the heterogeneous functional circuit blocks differ from one another; and
   multiple selectable communication interfaces configured to permit the heterogeneous functional circuit blocks to exchange data with one another using the communication protocols of the respective heterogeneous functional circuit blocks.

2. The SoC of claim 1, wherein the multiple selectable communication interfaces comprise one or more of:
   programmable circuitry configured as an interface adaptor that translates between the communication protocol of a first one of the heterogeneous functional circuit blocks and the communication protocol of a second one of the heterogeneous functional circuit blocks;
   network-on-chip (NoC) circuitry and first and second NoC interface circuits that translate between a packet-based protocol of the NoC circuitry and the respective communication protocols of the first and second heterogeneous functional circuit blocks to permit the first and second heterogeneous functional circuit blocks to exchange data with one another through the NoC circuitry; and
   first and second direct memory access (DMA) controllers that permit the first and second heterogeneous functional circuit blocks to exchange data with one another through a shared region of memory.

3. The SoC of claim 2, wherein the multiple selectable communication interfaces comprises the programmable circuitry configured as an interface adaptor that translates between the communication protocol of a first one of the heterogeneous functional circuit blocks and the communication protocol of a second one of the heterogeneous functional circuit blocks.

4. The SoC of claim 2, wherein the multiple selectable communication interfaces comprise:

the first and second direct memory access (DMA) controllers that permit the first and second heterogeneous functional circuit blocks to exchange data with one another through a shared region of memory.

5. The SoC of claim 2, wherein the multiple selectable communication interfaces comprise
the network-on-chip (NoC) circuitry and first and second NoC interface circuits that translate between a packet-based protocol of the NoC circuitry and the respective communication protocols of the first and second heterogeneous functional circuit blocks to permit the first and second heterogeneous functional circuit blocks to exchange data with one another through the NoC circuitry.

6. The SoC of claim 2, wherein the multiple selectable communication interfaces comprise:
the programmable circuitry configured as an interface adaptor that translates between the communication protocol of a first one of the heterogeneous functional circuit blocks and the communication protocol of a second one of the heterogeneous functional circuit blocks;
the network-on-chip (NoC) circuitry and the first and second NoC interface circuits that translate between a packet-based protocol of the NoC circuitry and the respective communication protocols of the first and second heterogeneous functional circuit blocks to permit the first and second heterogeneous functional circuit blocks to exchange data with one another through the NoC circuitry; and
the first and second direct memory access (DMA) controllers that permit the first and second heterogeneous functional circuit blocks to exchange data with one another through a shared region of memory.

7. The SoC of claim 1, further comprising:
a processor and memory;
wherein the multiple selectable communication interfaces are further configured to permit the processor and a first one of the heterogeneous functional circuit blocks to exchange data with one another using a communication protocol of the processor and the communication protocol of the first heterogeneous functional circuit block.

8. The SoC of claim 1, wherein:
a first one of the heterogeneous functional circuit blocks comprises fixed-function circuitry; and
a second one of the heterogeneous functional circuit blocks is configured in programmable circuitry of the SoC as a plug-in module.

9. The SoC of claim 1, wherein least a portion of the multiple selectable communication interfaces comprise programmable circuitry of the SoC.

10. The SoC of claim 2, wherein at least a portion of the multiple selectable communication interfaces comprise a processor and memory configured to permit two or more of the heterogeneous functional circuit blocks to exchange data with one another using the communication protocols of the respective heterogeneous functional circuit blocks.

11. The SoC of claim 1, wherein the heterogeneous functional circuit blocks comprise:
a network subsystem configured to interface with an external packet-switched network;
a host subsystem configured to interface with a host device; and
an accelerator circuit block configured to process data received from the network interface subsystem and/or the host subsystem.

12. The SoC of claim 11, wherein the accelerator circuit block is further configured to perform a task selected from a group that comprises:
a direct memory access task;
a cryptographic task;
a network data plane task; and
a network control plane task.

13. The SoC of claim 12, wherein at least a portion of the accelerator circuit block comprises a plug-in module implemented in programmable of the SoC.

14. The SoC of claim 1, further comprising a processor and memory, wherein one or more of the heterogeneous functional circuit blocks and the processor and memory are configured to perform one of more of:
control plane tasks;
telemetry tasks;
DMA offload tasks;
cryptographic offload tasks;
network data plane offload tasks;
configurable header extensions;
hot add/remove new functions;
configurable data plane offload tasks; and
coherent accelerator tasks.

15. A system-on-a-chip (SoC), comprising:
a host subsystem configured to interface with a local device;
a network subsystem configured to interface with an external packet-switched network;
an accelerator block comprising multiple heterogeneous functional circuit blocks, each configured to perform a respective one of multiple tasks on data from the host subsystem and/or the network subsystem, wherein communication protocols of the heterogeneous functional circuit blocks differ from one another; and
multiple selectable communication interfaces configured to permit the heterogeneous functional circuit blocks to exchange data with one another using communication protocols of the respective heterogeneous functional circuit blocks.

16. The SoC of claim 15, wherein the multiple selectable communication interfaces comprises one or more of:
network-on-chip (NoC) circuitry and first and second NoC interface circuits that translate between a packet-based protocol of the NoC circuitry and the respective communication protocols of first and second ones of the heterogeneous functional circuit blocks to permit the first and second heterogeneous functional circuit blocks to exchange data with one another through the NoC circuitry;
programmable circuitry configured as an adaptor that translates between the communication protocol of a first one of the functional circuit blocks and the communication protocol of a second one of the functional circuit blocks; and
first and second direct memory access (DMA) controllers that permit the first and second heterogeneous functional circuit blocks to exchange data with one another through a shared region of memory.

17. The SoC of claim 15, further comprising:
a processor and memory;
wherein the multiple selectable communication interfaces are further configured to permit the processor and a first one of the functional circuit blocks to exchange data with one another using a communication protocol of the processor and the communication protocol of the first heterogeneous functional circuit block.

18. The SoC of claim 15, wherein:
a first one of the heterogeneous functional circuit blocks comprises fixed-function circuitry; and
a second one of the heterogeneous functional circuit blocks is configured in programmable circuitry of the SoC as a plug-in module.

19. A method, comprising:
in a system-on-a-chip (SoC),
 interfacing with an external packet-switched network through a network subsystem of the SoC a system-on-a-chip (SoC);
 interfacing with a local device through q host interface subsystem of the SoC;
 processing data from the network subsystem and/or the host interface subsystem using heterogeneous functional circuit blocks of the SoC, wherein communication protocols of the heterogeneous functional circuit blocks differ from one another; and
 using one or more of multiple selectable communication interfaces of the SoC to exchange data amongst the heterogeneous functional circuit blocks using the communication protocols of the respective heterogeneous functional circuit blocks.

20. The method of claim 19, wherein the multiple selectable communication interfaces comprise one or more of:
 programmable circuitry configured as an interface adaptor that translates between the communication protocol of a first one of the heterogeneous functional circuit blocks and the communication protocol of a second one of the heterogeneous functional circuit blocks;
 network-on-chip (NoC) circuitry and first and second NoC interface circuits that translate between a packet-based protocol of the NoC circuitry and the respective communication protocols of the first and second heterogeneous functional circuit blocks to permit the first and second heterogeneous functional circuit blocks to exchange data with one another through the NoC circuitry; and
 first and second direct memory access (DMA) controllers that permit the first and second heterogeneous functional circuit blocks to exchange data with one another through a shared region of memory.

\* \* \* \* \*